Patented May 27, 1941

2,243,424

UNITED STATES PATENT OFFICE 2,243,424

FLUX COMPOSITION FOR WELDING AND SOLDERING ALUMINUM

Oskar Horowitz, Brooklyn, N. Y., assignor to Albert I. Elias, New York, N. Y.

No Drawing. Application November 4, 1939, Serial No. 302,873

9 Claims. (Cl. 148—26)

This invention relates to a flux for welding or soldering aluminum or its alloys.

The common method of joining together two pieces of aluminum by welding or soldering consists in heating the aluminum to a temperature where it begins to "sweat," that is to say, to melt on the surface, then "puddling" the surface, that is to say, stirring up the oxide which forms on the surface and in some cases scraping it off with an iron rod, and then applying the welding wire or solder on the thus cleaned aluminum surface immediately that the oxide has been stirred up or scraped off. This method requires considerable skill and is unsatisfactory even when skilfully practiced, since the melting aluminum tends to occlude particles of the oxide, thus rendering the welded joint weaker than the aluminum metal itself, and also because the high welding temperature used results in crystallization of the aluminum at the joint which renders the metal at the joint relatively brittle.

A number of fluxes for the aluminum welding and soldering operation have heretofore been suggested and used. These have been found serviceable, but they do not meet all of the fundamental requirements of an efficient aluminum flux. A good aluminum flux should possess the following three inter-related characteristics: (1) It should dissolve or otherwise remove (as by floating) the aluminum oxide which exists on the surface or forms at the welding temperatures, (2) it should assist the flow of the melting or molten aluminum, and (3) it should lower by a substantial amount the melting point of the aluminum at the welding region. These three characteristics or functions may be more briefly referred to as oxide removal, surface wetting, and melting point lowering. It is, of course, important that these three functions be carried out inter-relatedly. So far as I am aware, the aluminum fluxes which have heretofore been suggested and used have failed to satisfy these three requirements and particularly the third requirement, namely, the lowering to a substantial extent the melting point of the aluminum. The flux of my present invention is capable of meeting these requirements and inter-relatedly performing these three stated functions. The most important of these is the lowering of the melting point of the aluminum a substantial amount. The flux composition of my present invention itself melts at about 940° F. and causes the aluminum at the welding region to melt and flow at about 970° F., this being a substantial drop from the normal melting point of aluminum which is 1217° F. At these lowered temperatures (940° to 970° F.) the flux composition of my present invention also serves very efficiently to float or otherwise remove the formed oxide on the surfaces to be welded, and effectively assists the molten metal to flow along the joined area.

The actual melting and uniting of aluminum by means of a flux at a temperature below 1000° F., is, so far as I am aware, a departure from standard practice and has not heretofore been accomplished. The carrying out of the welding operation at this lowered temperature accomplishes a number of far-reaching results. Primarily, the lowered temperature localizes the welding or fusion area, eliminates embrittlement, and resutls in increased tensile strength of the aluminum at the welded joint. I have found that a weld produced with the flux composition of the present invention is devoid of brittleness and possesses a tensile strength substantially the same as that of the aluminum itself. I have also found that at these lowered temperatures and with the use of the present composition flux, that the oxide or slag absorption or flotation is surprising in its rapidity. It is also noteworthy to observe that the use of lower temperatures in producing the efficient weld involves the point of heat economy. Other important advantages of this composition flux are that it does not give off any dangerous fumes and that it does not leave any unwashable corrosive residues.

To accomplish these objects, I have discovered that the flux composition should contain a halogenide of cadmium combined with a halogenide of copper, and as an example of this, I use cadmium chloride and cuprous chloride. I have found that the use of either cadmium chloride or cuprous chloride alone in the composition will not produce the results, the weld obtained thereby being brittle and relatively weak. In combination with these metal halogenides, I employ the alkali metal halogenides usually used in these aluminum fluxes to make possible an easier flowing effect, such halogenides being the halogenides of, for example, potassium, sodium, lithium, cesium and rubidium, either alone or a mixture thereof. In addition to this, I prefer to use or add to the composition a halogenide of one of the rare earth metals such, for example, as cerium, which functions to stabilize the composition. This halogenide of the rare earth metal, for example cerous chloride where cerium is used, serves to prevent the composition from absorbing moisture upon standing, and thus stabilizes the same, and it also appears to impart a less critical melting temperature range to the composition and an easier lifting off of the aluminum oxide.

The following are examples of the flux composition embodying the present invention, the percentages being given by weight.

*Example I*

| | Per cent |
|---|---|
| Cadmium chloride | 10 |
| Cuprous chloride | 29.1 |
| Cerous chloride | 9 |
| Potassium chloride | 34.2 |
| Potassium acid fluoride | 6.6 |
| Sodium chloride | 6.6 |
| Lithium chloride | 4.5 |

*Example II*

| | Per cent |
|---|---|
| Cadmium chloride | 10 |
| Cuprous chloride | 30 |
| Cerous chloride | 5 |
| Potassium chloride | 41 |
| Potassium acid fluoride | 4 |
| Sodium chloride | 7 |
| Lithium fluoride | 3 |

*Example III*

An example without the use of the cerous chloride is:

| | Per cent |
|---|---|
| Cadmium chloride | 56 |
| Cuprous chloride | 20 |
| Potassium chloride | 10 |
| Potassium acid fluoride | 2 |
| Sodium chloride | 2 |
| Lithium chloride | 10 |

I prefer the compositions in which a halogenide (or a mixture of halogenides) of the rare earth metals is used because of its stabilizing effect. The halogenides of the alkali metals may be used between 10% and 75% by weight of the total mixture. Instead of cadmium chloride and cuprous chloride, I may use other halogenides thereof such as the bromides, the iodides, and the fluorides, or a mixture of these. Instead of the chlorides of the alkali metals, I may also use other halogenides thereof such as the bromides, the iodides, the fluorides, or a mixture of these. The halogenides of cadmium and copper may be used in various relative proportions, although in the examples wherein a halogenide of a rare earth metal is used, I prefer to use the halogenides of cadmium and copper in the proportions of about 1 to 3. The rare earth metal may be used in the proportion of 1% to 20% of the mix.

I have found that the flux composition of my invention may be mixed with aluminum powder to produce an aluminum solder. I have found that such a solder may be made by mixing aluminum powder of between 18 to 120 mesh with the flux composition, the aluminum powder being from 15 to 30% by weight of the mix.

The flux composition of my present invention and the uses and advantages thereof will, in the main, be fully apparent from the above-detailed description. It will be further apparent that I may make changes in the relative proportions of the ingredients of the composition and substitutions of equivalents in these ingredients, all as described above, without departing from the spirit of the invention defined in the following claims.

What I claim is:

1. A flux for welding or soldering aluminum comprising a halogenide of cadmium, a halogenide of copper and halogenides of alkali metals.

2. A flux for welding or soldering aluminum comprising a halogenide of cadmium, a halogenide of copper, a halogenide of a rare earth metal, and halogenides of alkali metals.

3. A flux for welding or soldering aluminum containing a halogenide of cadmium and a halogenide of copper.

4. A flux for welding or soldering aluminum containing cadmium chloride, cuprous chloride and halogenides of alkali metals.

5. A flux for welding or soldering aluminum containing cadmium chloride about 10%, cuprous chloride about 30%, and halogenides of alkali metals.

6. A flux for welding or soldering aluminum containing cadmium chloride about 10%, cuprous chloride about 30%, a rare earth metal chloride from 1 to 20%, and the remainder in halogenides of alkali metals.

7. A flux for welding or soldering aluminum comprising halogenides of cadmium, copper, cerium, potassium, sodium and lithium.

8. A flux for welding or soldering aluminum comprising cadmium chloride, cuprous chloride, cerous chloride, potassium chloride, potassium acid fluoride, sodium chloride and lithium chloride.

9. The flux of claim 8 wherein cadmium chloride and cuprous chloride are in the proportion of about 1 to 3.

OSKAR HOROWITZ.